United States Patent [19]
Groppel et al.

[11] 3,922,177
[45] Nov. 25, 1975

[54] METHOD FOR CONTROLLING THE WATER BUDGET OF RECHARGEABLE METAL-AIR CELLS AND METAL-AIR BATTERIES

[75] Inventors: Dieter Groppel, Erlangen; Dieter Kuhl, Bubenreuth, both of Germany

[73] Assignee: Siemens Aktiengesellschaft, Munich, Germany

[22] Filed: Nov. 6, 1973

[21] Appl. No.: 413,219

[30] Foreign Application Priority Data
Nov. 9, 1972 Germany............................ 2254885

[52] U.S. Cl................................. 136/86; 136/164
[51] Int. Cl.²........................................ H01M 8/18
[58] Field of Search ................. 136/86 A, 86 S, 164

[56] References Cited
UNITED STATES PATENTS

| | | | |
|---|---|---|---|
| 3,418,171 | 12/1968 | Popat............................... | 136/86 A |
| 3,436,270 | 4/1969 | Oswin et al....................... | 136/86 A |
| 3,457,115 | 7/1969 | Kent.................................. | 136/86 A |
| 3,462,307 | 8/1969 | Voorhies et al.................. | 136/86 A |
| 3,468,711 | 9/1969 | Jagid et al......................... | 136/86 A |
| 3,479,225 | 11/1969 | Chodosh et al................... | 136/86 A |
| 3,479,226 | 11/1969 | Oswin................................ | 136/86 A |
| 3,497,388 | 2/1970 | Weissman......................... | 136/86 A |
| 3,518,123 | 6/1970 | Katsoulis et al.................. | 136/86 A |
| 3,630,785 | 12/1971 | Jagid et al......................... | 136/86 A |
| 3,772,089 | 11/1973 | Bennett et al.................... | 136/86 A |

*Primary Examiner*—Patrick P. Garvin
*Assistant Examiner*—William G. Wright
*Attorney, Agent, or Firm*—Kenyon & Kenyon Reilly Carr & Chapin

[57] ABSTRACT

A method for controlling the water budget of rechargeable metal-air cells and batteries which contain an aqueous electrolyte in which the air electrodes are made with a hydrophobic layer on the gas side and the gas side at least partially covered with water during the charging phase, so that water vapor diffuses through the air electrodes and into the electrolyte making up for water losses.

8 Claims, 3 Drawing Figures

METHOD FOR CONTROLLING THE WATER BUDGET OF RECHARGEABLE METAL-AIR CELLS AND METAL-AIR BATTERIES

BACKGROUND OF THE INVENTION

This invention relates to rechargeable metal-air cells and batteries of the type having an aqueous electrolyte in general, and more particularly to a method for controlling the water budget of such cells and batteries.

Metal-air cells and batteries have been developed and are presently being proposed for use in the field of electric traction. It is necessary in such an application that the batteries be capable of recharging after discharge. This permits high efficiency and adequate periods of operation. In order to accomplish the construction of a rechargeable battery, metal electrodes which are rechargeable are used. In addition air electrodes which can be used both for discharge and charging are preferable. When cells and batteries of this nature are charged, water is removed from the aqueous electrolyte. The water losses occur partially through evaporation of the water through the porous air electrodes and further because of the electrolysis of the water and through the gases formed during electrolysis i.e. oxygen and hydrogen escaping from the cell or battery saturated with water vapor which they carry along with them. Water losses also occur during the discharging process since water vapor can escape through the porous air electrodes.

Just as in conventional storage batteries, these water losses must be made up in order to prevent excessive electrolyte concentrations or a drying up of the battery. Up to now, this refilling was done by hand, which type of restoring has been found to be unsatisfactory and extremely costly, particularly for batteries having a large number of cells. In addition, the water quantity must be added during the charging process in several steps, for example, immediately prior to and after charging since with one time refilling the danger of irreversible damage to the metal electrodes through excessive electrolyte concentration or temporary partial drying out of the electrodes, either during charging or discharging exists. Thus, it can be seen that there is a need for a method of controlling the water budget of rechargeable metal-air cells and batteries of this type which avoids these various difficulties and disadvantages. Such a method should achieve a uniform addition of water in a steady manner over an extended period of time to maintain the proper amount of water in the electrolyte at all times. Furthermore, such a method should be able to make up uniformly the water loss of all individual cells of the battery over an extended period of time no matter how many cells are in the battery without a substantial increase in effort.

SUMMARY OF THE INVENTION

The present invention achieves this method by using air electrodes having a hydrophobic layer on the gas side, and by at least partially covering the air electrodes on the gas side with water during the charging process. When this is done, water vapor diffuses toward the electrolyte through the gas-filled pores due to the water vapor pressure gradient. The arrangement permits making up water losses that occur during charging and discharging in an extremely simple manner. With regard to single cells, the cell need only be placed, during the charging phase, at least partially in a container of water. Alternatively, the cell may be placed in a container and water added thereto in such an amount so that the layer of the air electrode on the gas side is at least partially covered with water.

Typically, metal-air cells are constructed so that two air or oxygen electrodes are provided, one on each side of a central bilateral-acting metal electrode which is immersed in the electrolyte. In this type of arrangement, when the method of the present invention is used, the pores of the air electrodes on the gas side are covered with water and on the other side with the electrolyte. This causes menisci of liquid to form due to the hydrophobic character of this layer with the pores themselves remaining filled with gas, essentially air. Due to the existing water vapor pressure gradient between the water on the one side and the aqueous electrolyte on the other side of the hydrophobic layer, water vapor diffuses into the interior of the cell and water enrichment of the electrolyte thereby occurs. When metal-air cells are arranged in groups to make a metal-air battery, the individual cells are generally arranged so that air electrodes of different cells face each other with a space remaining between them for the access of air. With an arrangement such as this, the present invention envisions introducing the water into these air spaces whereupon diffusion of the water vapor will take place from one and the same space into two individual cells.

In addition to the above mentioned advantages, the method of the present invention offers a number of further advantages. Through the method of the present invention no special measures must be taken for making up the water losses and the normally used cell filling devices such as filling guns, etc., can be eliminated. By covering the air electrodes with water during the charging process the evaporation losses described above which usually occur during charges can be at least partially prevented thereby requiring an addition of less water than would otherwise be necessary. Furthermore, the introduction of the water by means of diffusion can be done using normal tap water rather than distilled water which is normally used as in making additions to the electrolyte. In addition, the water surrounding the cell has a cooling effect so that the cell temperature does not rise appreciably during the charging process. It has been discovered that the life of the metal electrodes is thus increased. Finally, the steady feeding of the water during charging also has an effect such that no large differences in the concentration of the electrolyte occur within the cells, further increasing the lift and also the activity of the metal electrodes.

In the practice of the present invention the water budget i.e. the amount of water to be introduced into the cell is controlled so that the air electrodes are covered on the gas side at least partially with water, a make up process taking place at least during part of the charging phase. That is, control is possible both by the amount of the immersion and the time of immersion. In addition, the diffusion of the water vapor can also be influenced to obtain an increase in vapor pressure difference between the water and electrolyte by adjusting the water temperature. Thus, by increasing the water temperature, additonal water per unit time will be introduced into the cell.

In batteries of this nature, the purpose of the air or oxygen electrodes is that of cathodically reacting the oxygen of the air during discharge otherwise referred to as oxygen dissolution and also the anodic formation of oxygen during the charging, also referred to as oxygen precipitation. Preferably both functions should be performed by one electrode although, as will be pointed out below, an auxiliary electrode may be used during charging. However, in accordance with the aim of having an electrode which can perform both functions, the present invention discloses a two layer electrode having a layer on the gas side which contains hydrophobic material and a catalyst for dissolving oxygen and a layer on the electrolyte side which is hydrophilic and contains a catalyst for oxygen precipitation. Another type of electrode disclosed is a three layer electrode in which the layer on the gas side contains only hydrophobic material. The middle layer contains the catalyst for oxygen dissolution and may also be hydrophobic. The third layer i.e. the hydrophilic layer on the electrolyte side contains the catalyst for oxygen precipitation. Electrodes of this nature have the advantage that no hydrophilic materials of any kind are present in the layer on the gas side, and in particular no hydrophilic catalytic material.

In both the two layer and three layer electrodes, polytetrafluorethylene is preferably used as the hydrophobic materials in the form of a porous diaphragm or film. Other suitable hydrophobic materials are the polymerisates of fluorinated hydrocarbons, for example, polytrifluorethylene and polytrifluorchlorethylene.

Air electrodes, which permit only the cathodic oxygen reaction may of course be used. These electrodes generally have two layers with the layer on the gas side comprising hydrophobic material and the layer on the electrolyte containing a catalyst for oxygen dissolution. When using electrodes of this nature, a third or auxiliary electrode must be used for oxygen precipitation during charging. In addition, with these air electrodes, the layer on the gas side preferably consists of polytetrafluorethylene. Various rechargeable electrodes can be used as metal electrodes in well known fashion.

DETAILED DESCRIPTION OF THE PREFERRED EMBODIMENT

Figure 1:
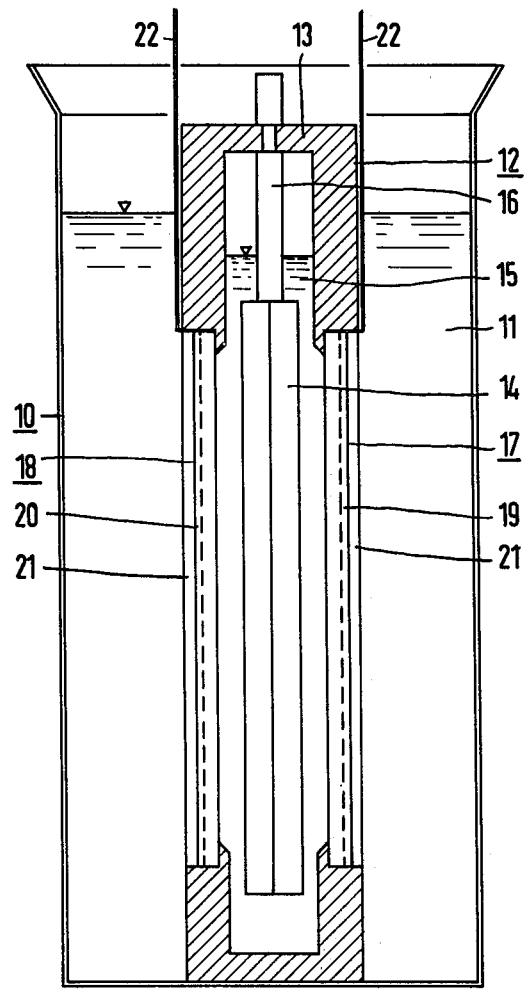
FIG. 1 is a cross-sectional view illustrating a cell immersed in water according to the present invention.

FIG. 1 illustrates a metal air cell 12 which is partially immersed in a container 10 filled with water 11. The cell 12 comprises a cell frame 13 which may be made, for example, of plastic, within which is contained a metal electrode 14 immersed in an electrolyte such as 6 m KOH in the elctrolyte chamber 15. The metal electrode 14 is attached to the frame 13 with a holder 16 which also provides for carrying current out of the cell. At each side of the electrolyte chamber 15 are air electrodes designated 17 and 18. These are also inserted into the frame 13 and held therein in a liquid tight manner. The hydrophobic layer on the gas side of electrode 17 is designated with the reference numeral 19 and that of electrode 18 and 20. As shown, the electrodes 17 and 18 are not flush with the frame 13 but are instead recessed to form an air space 21. If a plurality of single cells such as cell 12 are joined to form a battery, the water may be placed in these air spaces. The contact leads of the air electrodes 17 and 18 are designated by the reference numerals 22.

Figure 2:
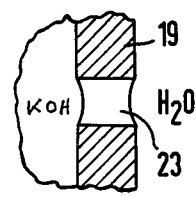
FIG. 2 is a sectional view of a portion of the air electrode of the cell of FIG. 1 showing a pore therethrough.

FIG. 2 is an enlarged section showing the hydrophobic layer 19 of the air electrode 17. On the gas side, the hydrophobic layer is covered with water [$H_2O$]. On the opposite side it is covered with the elctrolyte, for example, KOH. The $H_2O$ and KOH each form a meniscus of the liquid with the pore 23 being filled with air. The pore is of such a size so that the $H_2O$ or KOH will not pass therethrough. However, diffusion of water vapor takes place within the pore from the water to the electrolyte because of the existing vapor pressure gradient.

Figure 3:
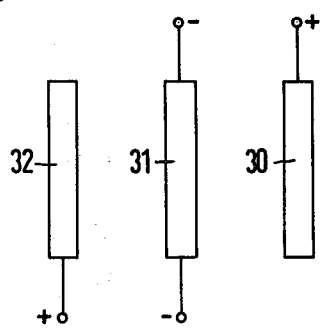
FIG. 3 is a schematic diagram illustrating the electrode arrangement for a cell which uses an auxiliary charging electrode.

FIG. 3 is a schematic illustration of a possible electrode arrangement in a rechargeable metal-air cell having an auxiliary charging electrode. During discharge, the air electrode 30, which permits only oxygen dissolution, is connected along with the rechargeable metal electrode 31 to the load. For recharging, the rechargeable metal electrode and the auxiliary charging electrode, which causes oxygen percipitation, are connected across the source. The auxiliary electrode 32 may, for example, be a nickel screen.

As noted above, both three-layer and two-layer electrodes may be used as the air electrode 17 and 18. A three-layer electrode may be manufactured using carbon powder, which may contain a binder such as polytetrafluorethylene or polyethylene and a filler such as sodium sulfate or ammonium oxalate and possibly an additional catalyst such as silver, as the middle portion and arranged between a polytetrafluoroethylene diaphragm [PTFE diaphragm] and a porous nickel plate, the arrangement being pressed together with a pressure of about 1,000 to 2,000 N/cm² [100 to 200 kg/cm².] After pressing the arrangement will subsequently be sintered for one hour at a temperature of about 380° C. The electrode will be made in a thickness of about 1.2 mm. Preparation of the porous nickel plate can be accomplished by pressing nickel powder having a grain size of about 8 to 10 $\mu$ at a pressure of about 8,000 N/cm² and sintering for half an hour at about 800° C in a hydrogen atmosphere. The nickel plate should be made in a thickness of about 0.3mm, the area density should be about 0.15 g/cm² and the volume porosity about 50 percent. To make the porous PTFE diaphragm, polytetrafluorethylene in powder from and having a grain size of about 30 to 50 $\mu$ is suspended in n-propanol to form a fine dispersion after which it is drawn off, dried and sintered for half an hour at about 380° C. The resulting PTFE diaphragm is about 0.5 mm thick with an area density of the dry diaphragm of about 0.04 g/cm² and a volume porosity of about 65 percent. It is possible, however, to make diaphragms of smaller thickness. A PTFE diaphragm of this nature will exhibit essentially uniform microporosity. The micropores are such a size that the electrolyte is prevented from passing through the pores of the diaphragm due to the hydrophobic nature of the diaphragm. Through using PTFE powder with a grain size in the range of between 30 and 50 $\mu$ a microporous PTFE diaphragm which meets the above mentioned requirements is easily obtained.

The preparation of a two-layer electrode can be accomplished in similar manner with the exception that no PTFE diaphragm is used. To the catalytic material i.e. carbon, a quantity of hydrophobic material is added in such quantities so that a sufficient hydrophobic action of the layer is ensured.

In the operation of a metal-air cell of the kind described above and having an air electrode area of 100 cm², water losses take place as follows: The water consumption due to electrolysis during the charging phase and including water vapor carried along by the gases escaping during charging amounts to approximately 1 ml/hr. Water losses due to evaporation of water through the porous air electrodes during discharge amounts to approximately 2 ml/hr. Assuming a discharge time of 8 hours and a charging time of 16 hours, the total amount of water given out by a cell of this type is 32 ml. Thus, this is the quantity which must be made up or added during charging.

The amount of water which will be transferred to the interior of the cell per hour is a function of the thickness and porosity of the PTFE diaphragm along with the water temperature. It has been found that between 1 and 4 ml of water per hour can be brought into the interior of the cell where a total air electrode area of 200 cm² is provided i.e. an air electrode on each side of 100 cm². Thus, a maximum of 64 ml of water can be diffused during 16 hours. In addition to control through water temperature the amount of water transfered can be controlled by the degree of coverage of the air electrodes with water along with the amount of time the water is present outside the electrodes. With a three layer electrode such as that described above, and having a total electrode area of 200 cm² and complete coverage of the air electrodes with water at a temperature of about 20° C, approximately 32 ml of water will be brought into the cell during a charging period of 16 hours.

Thus, an improved manner of managing the water budget of a rechargeable metal-air cell has been described. Although specific manners of performing the method have been discussed and illustrated, it will be obvious to those skilled in the art that various modifications may be made without departing from the spirit of the invention which is intended to be limited solely by the appended claims.

What is claimed is:

1. A method for controlling the water budget of rechargeable metal-air cells and batteries of the type having an aqueous electrolyte comprising:
   a. using as air electrodes, electrodes having a hydrophobic layer on the gas side; and
   b. at least partially covering said hydrophobic layer with water for at least a portion of the charging phase whereby water vapor will diffuse into the electrolyte through the gas filled pores of the hydrophobic layer due to the vapor pressure gradient.

2. The invention according to claim 1 and further including the step of controlling the amount of diffusion by adjusting the water temperature.

3. The invention according to claim 1 and wherein said air electrode is a two-layer electrode with the layer on the gas side made of hydrophobic material and the layer on the electrolyte side containing a catalyst for oxygen dissolution.

4. The method according to claim 1 and wherein said air electrode is a two-layer electrode with the layer on the gas side made of hydrophobic material and containing a catalyst for oxygen dissolution and the layer on the elctrolyte side containing a catalyst for oxygen precipitation.

5. The method according to claim 1 wherein a threelayer air electrode is provided with the layer on the gas side comprising only hydrophobic material, the middle layer containing a catalyst for oxygen dissolution and the layer on the electrolyte side containing a catalyst for oxygen precipitation.

6. The invention according to claim 3 wherein said hydrophobic material is polytetrafluorethylene.

7. The invention according to claim 4 wherein said hydrophobic material is polytetrafluorethylene.

8. The invention according to claim 5 wherein said hydrophobic material is polytetrafluorethylene.

* * * * *

UNITED STATES PATENT AND TRADEMARK OFFICE
CERTIFICATE OF CORRECTION

PATENT NO. : 3 922 177
DATED : November 25, 1975
INVENTOR(S) : DIETER GRÖPPEL ET AL It is certified that error appears in the above-identified patent and that said Letters Patent are hereby corrected as shown below:

In Column 2, line 51, change "lift" to --life--

Signed and Sealed this twenty-third Day of March 1976

[SEAL]

Attest:

RUTH C. MASON
Attesting Officer

C. MARSHALL DANN
Commissioner of Patents and Trademarks